United States Patent [19]

French et al.

[11] 4,315,830

[45] Feb. 16, 1982

[54] METHOD FOR ALTERING THE CHARACTERISTICS OF POLYMERS

[75] Inventors: David M. French, Alexandria, Va.; J. T. L. Rosborough, Washington, D.C.; Clyde J. Swedenberg, Greenville, S.C.

[73] Assignee: The United States of America as represented by the Secretary of the Navy, Washington, D.C.

[21] Appl. No.: 219,184

[22] Filed: Jan. 19, 1972

[51] Int. Cl.$^3$ .................... C06D 5/06; C09K 3/00
[52] U.S. Cl. .................... 252/182; 149/19.5; 149/19.6; 149/19.9; 149/19.91; 149/19.92; 149/19.93; 260/31.6; 260/31.8 M; 260/31.8 PQ; 260/31.8 G; 260/31.8 HR; 260/31.8 H; 260/9 CR; 560/146; 528/406; 528/407; 528/408; 528/418; 528/419; 528/423
[58] Field of Search ......... 260/31.6, 31.8 M, 31.8 PQ, 260/31.8 G, 78.4 D, 96 R, 479 R, 479 S, 485 G, 485 S, 31.8 HR, 31.8 H; 560/144, 146, 255; 149/19.9, 19.6, 19.5, 19.91, 19.92, 19.93; 252/182; 528/406, 418, 407, 419, 408, 423

[56] References Cited

U.S. PATENT DOCUMENTS

| 3,305,523 | 2/1967 | Burnside | 149/19.9 |
|---|---|---|---|
| 3,309,348 | 3/1967 | Wentz, Jr. | 260/96 R X |
| 3,476,622 | 11/1969 | Harada et al. | 149/19.9 |
| 3,549,571 | 12/1970 | Berg, Jr. et al. | 260/31.8 M |
| 3,644,252 | 2/1972 | Shenfeld et al. | 260/31.8 M |
| 3,644,267 | 2/1972 | Jackson, Jr. et al. | 260/31.8 M |
| 3,686,361 | 8/1972 | Dewitt et al. | 260/31.6 |
| 3,734,786 | 5/1973 | Waldem et al. | 149/19.9 |
| 3,791,888 | 2/1974 | Hudson | 149/19.9 |
| 3,830,672 | 8/1974 | Lista | 149/19.9 |
| 3,830,675 | 8/1974 | Zelinski et al. | 149/19.9 |
| 3,839,106 | 10/1974 | De Prisque et al. | 149/19.9 |
| 3,853,646 | 12/1974 | Frankel et al. | 149/19.9 |
| 3,890,173 | 6/1975 | Filter et al. | 149/19.9 |
| 3,948,698 | 4/1976 | Elrick et al. | 149/19.9 |
| 4,221,617 | 9/1980 | Rudy et al. | 149/19.9 |

FOREIGN PATENT DOCUMENTS 1062712  3/1967  United Kingdom ......... 260/31.8 M

*Primary Examiner*—Teddy S. Gron
*Attorney, Agent, or Firm*—R. S. Sciascia; A. L. Branning; T. E. McDonnell

[57] ABSTRACT

A method for altering the characteristics of liquid telechelic polymers by means of reducing the reactive group content and adjusting the viscosity of a given liquid telechelic polymer. This is accomplished by means of a two stage process which comprises reacting some of the polymer's available reactive groups with a difunctional reactant and adding a diluent to produce a final composition of desired viscosity and reactive group content.

8 Claims, 1 Drawing Figure

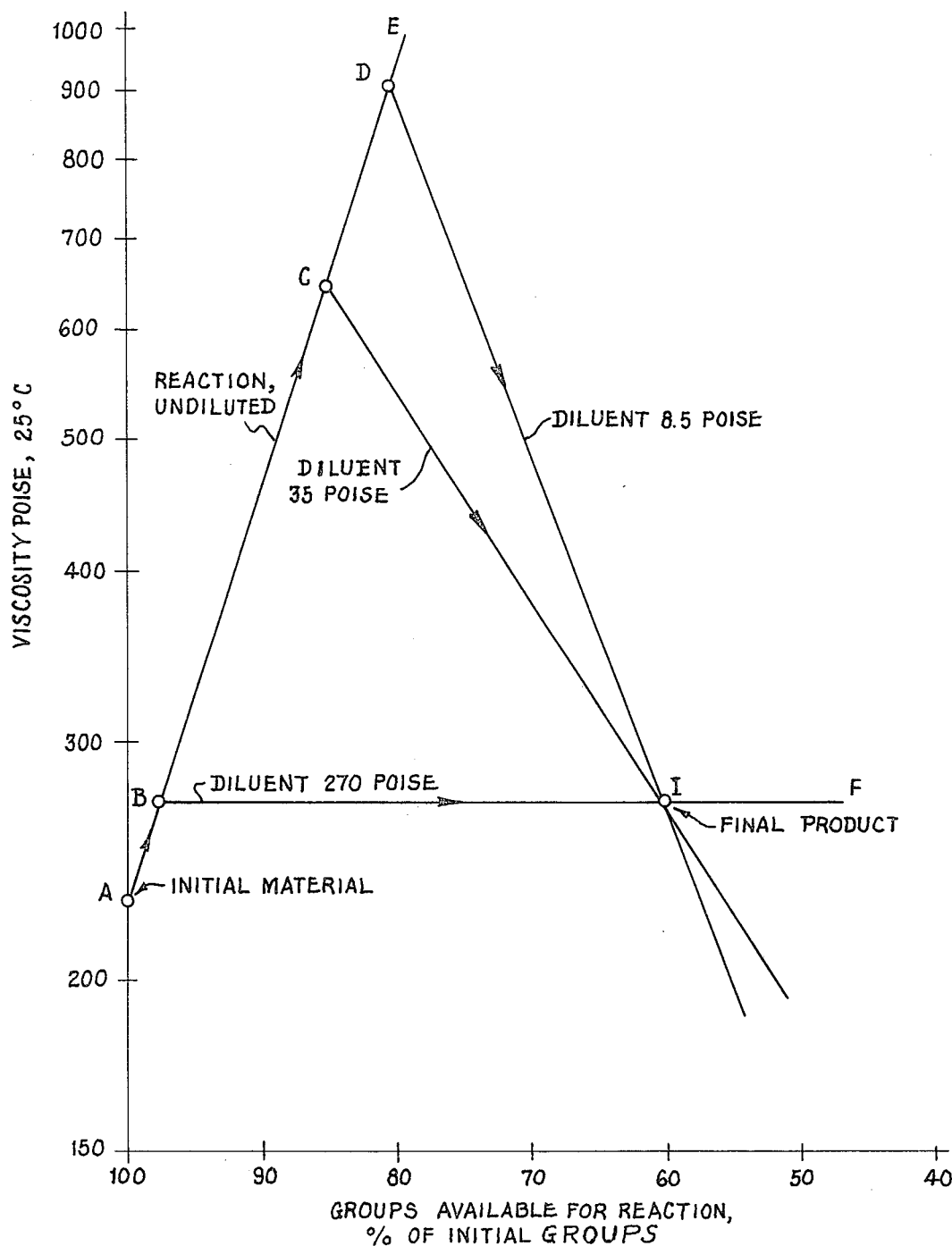

METHOD FOR ALTERING THE CHARACTERISTICS OF POLYMERS

BACKGROUND OF THE INVENTION

Telechelic polymers, which are polymers that contain chemically reactive groups at both ends of the molecular chains, are used in large volumes in a number of industries. They find wide use as sealants, adhesives, propellant binders and materials of construction. However, these telechelic polymers are commercially available in a limited number of grades or characteristics and one frequently needs such polymers with properties different from those commercially available. For instance, in the propellant industry, carboxyl or hydroxyl terminated polybutadiene may be required with a particular reactive groups content and viscosity which cannot be matched with any prepolymer which he can purchase. To avoid the expense of synthesizing, from start, a polymer with the desired properties, it would be much more advantageous to modify the properties of a polymer which is already commercially available.

BRIEF SUMMARY OF THE INVENTION

It is, therefore, an object of this invention to obtain a polymer with desired properties.

It is another object of the instant invention to obtain a liquid telechelic polymer having certain desired characteristics.

It is yet another object of the present invention to produce liquid telechelic polymers in an efficient, economical manner.

It is an additional object of this invention to convert a polymer having many reactive groups into a polymer having fewer functional groups.

It is a further object of the instant invention to alter the viscosity of a given polymer in order to obtain a polymer with a desired viscosity.

According to the present invention, the foregoing and other objects are attained by converting a liquid telechelic polymer with certain properties into a liquid telechelic polymer with fewer reactive groups and an altered viscosity. The modified polymers can be used for any of the uses that the starting polymer was used for, although the modified properties will produce a different effect in each particular use. The conversion is accomplished by treating the polymer with a bifunctional reagent which reacts with some of the reactive groups along the chain of the polymer and then adding a diluent. Both of these steps affect the viscosity and weight percentage of reactive groups on the final polymer.

BRIEF DESCRIPTION OF THE DRAWING

Still other objects and many of the attendant advantages of the present invention will be readily appreciated as the same becomes better understood by reference to the following detailed description when considered in connection with the accompanying drawing in which FIGURE shows some sample calculations which can be utilized in determining how much difunctional reactant and diluent are to be added to the initial polymer in order to obtain a polymer with the desired properties.

DETAILED DESCRIPTION OF THE PREFERRED EMBODIMENTS

The method by which functional content of a polymer is reduced along with an increase or decrease in viscosity of the polymer is a two part process. The first stage consists in treating a liquid polymer, having available reactive groups, with an adjustable proportion of a difunctional reactant and subsequently reacting the two, resulting in crosslinking between the chains of the polymer. This crosslinking results in a higher molecular weight product with a higher viscosity and a reduction in the total number of reactive groups along the chains. When a liquid telechelic polymer is utilized as the liquid polymer, the product will still be a telechelic polymer as the crosslinking of any two chains, each containing reactive groups at each end, results in a crosslinked chain having reactive groups at each end. The amount of difunctional reactant to be used depends on the number of reactive groups that one desires in the final product.

The second stage consists of adding to the starting polymer a nonfunctional polymer or plasticizer as a diluent. By adjusting the percent of difunctional reactant and the viscosity and volume of the nonfunctional diluent, a wide range of final products may be obtained. Also, because of the flexibility of the system, a wide range of starting polymers can be used to arrive at the same final product. It is noted that the addition of a diluent can occur either prior to, or subsequent to, the reaction between the initial polymer and the difunctional reactant. This is true because the diluent is not affected by said reaction. The diluent can be of the same viscosity or of higher viscosity or lower viscosity than the original polymer, depending on the desired characteristics of the final product.

Any liquid polymer can be used in the instant invention as long as it contains functional groups which can react with a difunctional group. Especially suitable are liquid telechelic polymers, since the final product will also be a liquid telechelic polymer and as such can still be used for the many purposes for which telechelic polymers are used. Similarly any difunctional reactant compound can be used to react with the polymer so long as the reactive groups present thereon are capable of reacting with the reactive groups on the chains of the polymer so as to crosslink those chains. Typical liquid polymers are hydroxy and carboxyl terminated telechelic polymers, such as the hydroxy and carboxyl terminated polymers of styrene, isoprene, isobutylene, ethylene, acrylonitrile, butadiene and copolymers and terpolymers of these materials. The only limitation upon molecular weight is that the polymers be of such viscosity that they be liquid at room temperature. Suitable difunctional reactants include the diglycidyl ether of 4,4'-dihydroxy diphenyl propane, diglycidyl ethers of polymers of the diglycidyl ether of 4,4'-dihydroxy propane, the diglycidyl either of ethylene glycol, the diglycidyl ether of diethylene glycol, the diglycidyl ether of triethylene glycol, the diglycidyl ether of butylene glycol, the diglycidyl ether of glycerol, the diglycidyl either of trimethylol propane, limonene dioxide, dicyclopentadiene dioxide, and other diepoxides. In addition, suitable diimine compounds such as phenyl bis 1-(2-methyl)-aziridinyl phosphine oxide or sulfide, bis 1-(2-ethyl)-aziridinyl sebacic acid amide or the methyl derivative, and bis 1-(2-ethyl)-aziridinyl benzene 1,3-dicarboxylic acid amide and including diisocyanates. As diluent, one may employ liquid plasticizers of any type, including esters, ethers, hydrocarbons, phosphates, or any other conventional plasticizer. It would be preferable to use as a viscosity modifier the nonfunctional polymer corresponding to the same polymer, with reactive groups, as the one used as the starting functional polymer. However, any conventional diluent is suitable. Typical diluents are liquid polybutadiene, liquid polyisoprene, liquid polybutene, hydrocarbon plasticizers derived from petroleum, coal tar and oleoresin, and esters such as dibutyl or dioctyl adipate, sebacate and azelate; as well as dioctyl pthalate.

The reaction conditions necessary for the reaction between the difunctional reagent and the initial polymer are those conditions which are known to react the appropriate groups. The temperature of the reaction will usually be from about 100° to about 160° C. and the reaction mass is generally heated anywhere from about 4 hours to about 3–4 days. These temperatures and time factors are generally dependent upon each other, with the goal of completeness of reaction uppermost in mind. For example, if a temperature of 130° C. requires 16 hours of reaction time, a temperature of 120° C. would require about 32 hours of reaction time while a temperature of 140° C. would require about 8 hours of reaction time, as an increase of 10° C. results in the approximate doubling of reaction time. The amounts of polymer and difunctional reagent depend on the number of functional groups on the polymer chains that are desired to be reacted. For example if one wanted to reduce the carboxyl content of a telechelic polymer to about 60 percent of its initial amount, one would add twice as much difunctional reagent as compared to the amount one would add if one wanted a telechelic polymer with about 80 percent of the initial amount of reactive groups present. It is essential that the amount of difunctional reactant added is not enough to react with all of the reactive groups present, since it is usually desired that most of the reactive groups remain.

To carry out the process of the instant invention, some simple calculations will usually be desired. To aid in these calculations, several tests are run at different difunctional reactant to polymer ratios to obtain line AE, which is shown in the FIGURE, in which the viscosity, which is the actual or bulk viscosity as determined at 25° C. by a rotating spindle viscometer, is plotted against the percent of groups available for reaction. As the difunctional reagent reacts with reactive groups initially present on the polymer, crosslinking takes place and the molecular weight and viscosity increase. Sample calculations using line AE are demonstrated as follows.

Suppose that one wishes to convert a telechelic polymer having a viscosity of about 230 poise to one having a viscosity of about 270 poise and containing about 60 percent of the reactive groups initially present. As mentioned supra, several tests are run at different difunctional reactant/polymer ratios to obtain line AE with point A representing the initial material. Enough difunctional reagent is then reacted with the polymer A to produce polymer B, which, according to the graph has the desired viscosity of 270 poise. However, in order to reduce the percentage of groups available for reaction to the desired 60 percent by weight of total composition, a diluent of 270 poise viscosity and with no functional groups, is added until the percentage by weight of the reactive group is the desired 60 percent. The proportion of diluent needed in the final mix to reach the point I can be calculated as:

$$100 \times \left[1 - \frac{\text{final percent at the desired viscosity (point I)}}{\text{initial percent at the desired viscosity (point B)}}\right]$$

$$\text{or } 100 \times \left[1 - \frac{60}{97.7}\right]$$

or 38.6 weight percent of diluent needed.

Another type of calculation arises where a particular level of plasticizer is desired, for example 30 weight percent, to produce the same final product I. Since the final weight percent of reactive groups is 60 weight percent after the addition of 30 weight percent of diluent, then the weight percent before the addition of diluent is $$\frac{60}{100 - 30}$$

or 85.8 weight percent. So, initial polymer A is reacted, until there is 85.8 weight percent of reactive groups remaining, i.e., until point C on line AE. Plasticizer is then added to produce 30 weight percent plasticizer, based, of course, on the final mix. If the density of the polymer and the plasticizer are the same, this will also be 30 volume percent. The necessary viscosity of the plasticizer to take the mix from the viscosity at point C, i.e., 650 poise, to the desired viscosity is calculated from the equation:

$$\text{Log } \eta_2 = \text{Log } \eta_1 - \frac{1}{V_2} \text{Log } \frac{\eta_1}{\eta_3}$$

Where
$\eta_1$ = viscosity of undiluted material;
$\eta_2$ = viscosity of diluent
$\eta_3$ = viscosity of mixture
$V_2$ = volume fraction of diluent
In the instant example, assuming equal density for diluent and polymer;

$$\text{Log } \eta_2 = \text{Log } 650 - \frac{1}{0.30} \text{Log } \frac{650}{270}$$
$$\eta_2 = 35 \text{ poise}$$

Thus the point I can be reached by reacting the polymer to any point along the line AE and diluting with a plasticizer of the proper viscosity. It is again noted that it is not necessary that the reaction reducing the reactive group content be carried out before addition of the diluent. The diluent may instead be added first and it will usually be desirable to do so.

A more comprehensive understanding of the invention can be obtained by referring to the following illustrative examples which are not intended to be unduly illustrative of the invention.

EXAMPLE 1

A carboxyl terminated polybutadiene (CTPB), which is available as HC-434 from Thiokol Chemical Corporation, has a carboxyl content of 2.30 weight percent and a viscosity at 25° C., using a rotating spindle viscometer, of about 230 poise. It was desired to change this into a polymer with a carboxyl content of 1.40 weight percent and a viscosity of 270 poise. The CTPB was reacted with a purified Bisphenol A Glycidyl ether type epoxide, which was the diglycidyl ether of 4,4'-dihydroxy diphenyl propane (DER 332 from Dow Chemical Corporation), and diluted 30 percent with a 35 poise nonfunctional polybutadiene. The exact procedure was as follows: the starting materials, 200 parts of the CTPB, 87.9 parts of the liquid polybutadiene and 3 parts of the diglycidyl ether of 4,4'-dihydroxy diphenyl propane were blended in a reaction Kettle while the temperature was adjusted to 130° C. and held at this temperature for 16 hours. The reaction Kettle was purged with $N_2$ during the reaction [this nitrogen atmosphere is necessary only when one is dealing with materials sensitive to oxygen]. The resulting polymer had a carboxyl content of 1.40 weight percent and a viscosity of 270 poise.

It will be evident to those skilled in the art that many variations and modifications can be practiced upon consideration of the foregoing disclosure. Some variations and modifications are believed to be within the spirit and scope of the present invention.

We claim:

1. A method of modifying a liquid telechelic polymer for uses requiring a lower reactive group content and a different viscosity which comprises:
    reacting to completion said liquid telechelic polymer with an amount of a difunctional reagent which amount does not cause said polymer to solidify so that said polymer has a reduced reactive-group content and an increased viscosity; and
    admixing a liquid plasticizing nonfunctional polymer which is structurally similar to said telechelic polymer except for the absence of functional groups with said telechelic polymer to produce a liquid polymer mixture with a reactive-group content less than said liquid telechelic polymer and with a viscosity equaled to or different from said liquid telechelic polymer.

2. The method of claim 1 wherein said telechelic polymer is a hydroxy- or carboxy-terminated polybutadiene.

3. The method of claim 1 wherein said difunctional reagent is selected from the group consisting of: (a) a diglycidyl ether of a compound selected from the group consisting of 4,4'-dihydroxy diphenyl propane, ethylene glycol, diethylene glycol, triethylene glycol, butylene glycol, glycerol and trimethylol propane; (b) limonene dioxide; (c) dicyclopentadiene dioxide, (d) phenyl bis 1-(2-methyl)-aziridinyl phosphine oxide; (e) phenyl bis 1-(2-methyl) aziridinyl phosphine sulfide (f) bis 1-(2-ethyl)-aziridinyl sebacic acid amide; (g) the methyl derivative of bis 1-(2-ethyl aziridinyl sebacic acid amide and (h) bis 1-(2-ethyl)-aziridinyl benzene 1,3-dicarboxylic acid amide.

4. The method of claim 3 wherein said non-functional polymer is selected from the group consisting of liquid polybutadiene, liquid polyisoprene, liquid polybutene, and liquid hydrocarbon plasticizers derived from petroleum, coal tar & oleoresin.

5. The method of claim 3 wherein said telechelic polymer is a hydroxy- or carboxy-terminated polybutadiene.

6. The method of claim 5 wherein said difunctional reagent is diglycidyl ether of 4,4'-dihydroxy diphenyl propane.

7. The method of claim 6 wherein diglycidyl ether of 4,4'-dihydroxy diphenyl propane is reacted in an amount sufficient to reduce the reactive group content of said telechelic polymer by about 20 percent.

8. The method of claim 6 wherein diglycidyl ether of 4,4'-dihydroxy diphenyl propane is reacted with telechelic polymer in a polymerto-ether ratio of about 200:3.

* * * * *